United States Patent
Sasaki

(10) Patent No.: US 8,890,997 B2
(45) Date of Patent: Nov. 18, 2014

(54) AUTOMATIC FOCUSING APPARATUS AND LENS APPARATUS INCLUDING THE AUTOMATIC FOCUSING APPARATUS

(75) Inventor: Ryohei Sasaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/990,484

(22) PCT Filed: Dec. 8, 2011

(86) PCT No.: PCT/JP2011/078979
§ 371 (c)(1),
(2), (4) Date: May 30, 2013

(87) PCT Pub. No.: WO2012/081647
PCT Pub. Date: Jun. 21, 2012

(65) Prior Publication Data
US 2013/0250162 A1     Sep. 26, 2013

(30) Foreign Application Priority Data

Dec. 17, 2010 (JP) .................................. 2010-281466

(51) Int. Cl.
*H04N 5/232* (2006.01)
*G02B 7/36* (2006.01)
*G02B 7/30* (2006.01)
*G03B 13/36* (2006.01)
*G03B 3/10* (2006.01)

(52) U.S. Cl.
CPC .............. *H04N 5/23212* (2013.01); *G02B 7/36* (2013.01); *G02B 7/30* (2013.01); *G03B 13/36* (2013.01); *G03B 3/10* (2013.01)
USPC ............................ 348/352; 348/353; 348/350

(58) Field of Classification Search
CPC .................... H04N 5/2356; H04N 5/23212
USPC .......... 348/345, 348, 349, 350, 352, 353, 354
See application file for complete search history.

(56) References Cited

U.S. PATENT DOCUMENTS

2005/0285967 A1* 12/2005 Suda .............................. 348/345
2008/0036902 A1*  2/2008 Tanaka .......................... 348/353
(Continued)

FOREIGN PATENT DOCUMENTS

JP     2-162308 A     6/1990
JP     2-205810 A     8/1990
(Continued)

OTHER PUBLICATIONS

International Search Report for PCT/JP2011/078979, dated Feb. 14, 2012.

*Primary Examiner* — Tuan Ho
*Assistant Examiner* — Zhenzhen Wu
(74) *Attorney, Agent, or Firm* — Rossi, Kimms & McDowell LLP

(57) ABSTRACT

An automatic focusing apparatus includes: a focus lens unit; a focus driver; a first focus detector that detects an in-focus state based on a phase difference; a second focus detector that detects an in-focus state using a signal from an image pickup element; a focus controller that controls the focus driver to perform focusing based on a first focus detection result and a second focus detection result; a movement detector that detects a movement of an object with components in a direction perpendicular to an optical axis based on an image signal obtained from the first focus detector; and a re-execution determination unit that determines whether to control the focus driver to re-execute focusing based on the first focus detection result and the second focus detection result that are newly detected after the execution of focusing and based on a movement detection result detected by the movement detector.

10 Claims, 7 Drawing Sheets

(56) References Cited

U.S. PATENT DOCUMENTS

| | | | |
|---|---|---|---|
| 2009/0115882 A1* | 5/2009 | Kawarada | 348/340 |
| 2012/0154670 A1* | 6/2012 | Hamamura | 348/353 |

FOREIGN PATENT DOCUMENTS

| | | |
|---|---|---|
| JP | 5-061092 A | 3/1993 |
| JP | 7-154669 A | 6/1995 |
| JP | 2001-194578 A | 7/2001 |
| JP | 2007-065290 A | 3/2007 |
| JP | 2007-174521 A | 7/2007 |
| JP | 2008-160315 A | 7/2008 |
| JP | 2009-139688 A | 6/2009 |
| JP | 2009-157130 A | 7/2009 |
| JP | 2009-171301 A | 7/2009 |

* cited by examiner

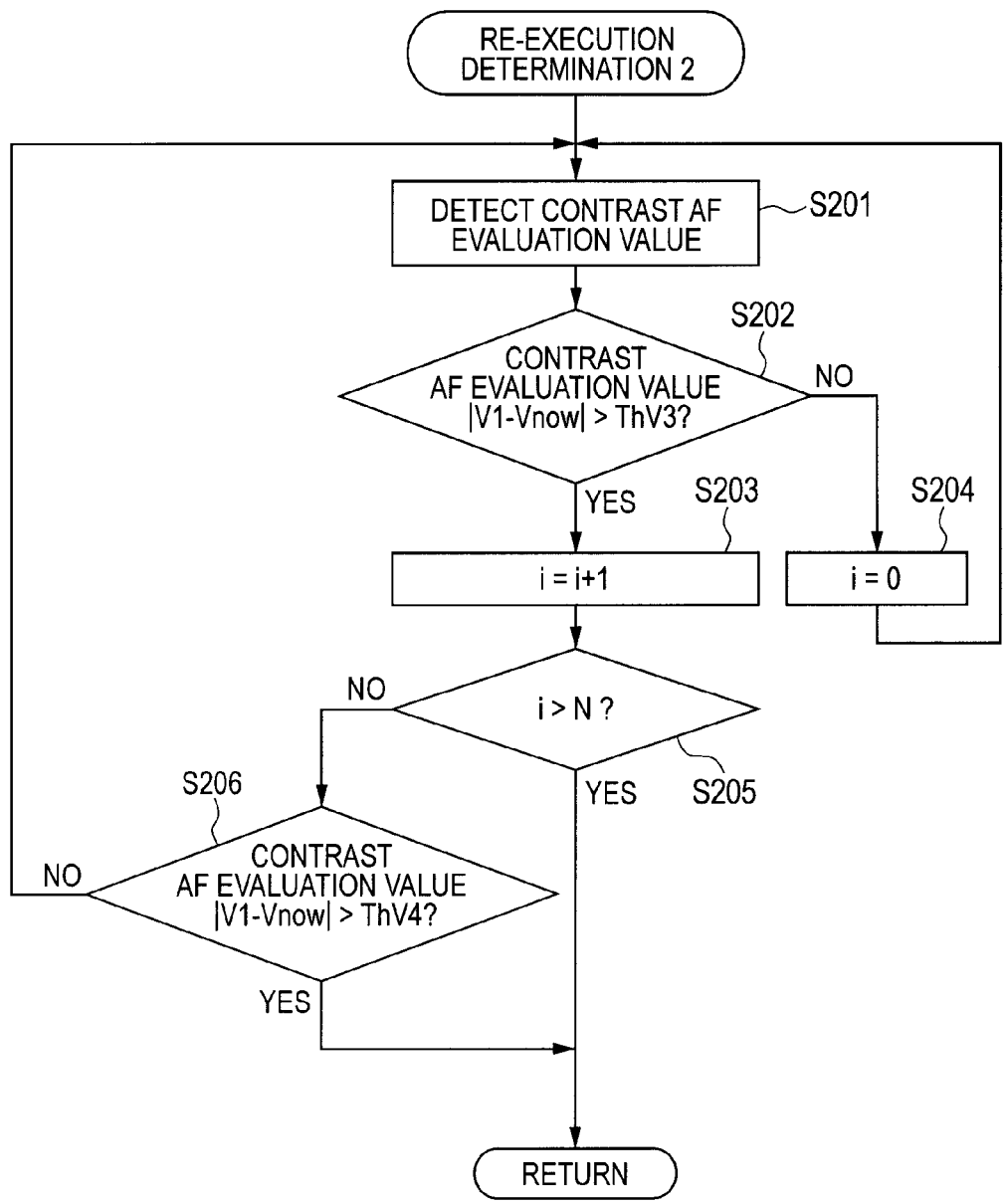

AUTOMATIC FOCUSING APPARATUS AND LENS APPARATUS INCLUDING THE AUTOMATIC FOCUSING APPARATUS

This application is a U.S. National Phase Application of PCT International Application PCT/JP2011/078979 filed on Dec. 8, 2011, which is based on and claims priority from JP 2010-281466 filed on Dec. 17, 2010, the contents of both of these documents are hereby incorporated in by reference in their entireties.

TECHNICAL FIELD

The present invention relates to an automatic focusing apparatus, and particularly, to an automatic focusing apparatus used in a still camera, a TV camera, and a video camera and a lens apparatus including the automatic focusing apparatus.

BACKGROUND ART

Conventionally, there are various proposals related to an automatic focusing technique used in a still camera, a TV camera, and a video camera.

For example, contrast based automatic focusing (hereinafter "contrast AF") is proposed, in which high frequency components of the image picked up by a picked up image element is extracted and the focus position is controlled by maximizing an evaluation value corresponding to the sharpness of the image to perform focusing. In the contrast AF, a search operation, that is, changing the position of the focus lens, is required to determine the direction of the movement of the focus lens where the evaluation value corresponding to the contrast of the image relative to the focus position is the maximum and to determine the maximum point. It is known that the focusing accuracy of the contrast AF is high, because focusing is determined using an image signal obtained based on an output signal from the image pickup element that picks up an image of an object.

So-called external measuring AF is also proposed, in which a distance measuring sensor is arranged independently from an image pickup lens, and the in-focus position of the focus lens is calculated from an obtained object distance to control the focus lens to perform focusing. Phase difference system automatic focusing (hereinafter, "phase difference AF") is also proposed, in which a split optical system splits a beam passed through an image pickup lens, an in-focus state with respect to the object is detected from the split beams, and focusing is performed based on the result.

Among these, in the external measuring AF and the phase difference AF, the beam from the object is divided into two beams in an in-focus state detecting apparatus to form two images on sensors. Correlation computing is applied to photoelectrically converted signals of two images to detect the phase difference. A defocus amount and an object distance are calculated from the phase difference, and the defocus amount and the object distance are converted to a drive target position of the focus lens to control the focus lens to perform focusing.

In the external measuring AF and the phase difference AF, it is known that there is no need to perform a search operation performed in the contrast AF, and the focusing speed is fast.

To utilize the high focusing accuracy of the contrast AF and the high focusing speed of the external measuring AF and the phase difference AF, a hybrid AF system in which a combination of the contrast AF and external measuring AF and phase difference AF is further proposed.

To maintain the in-focus state with respect to the target object by automatic focusing, an automatic focusing operation needs to be executed every time the object distance changes to cause the object being out of focus.

In the automatic focusing apparatus including only the contrast AF, if the evaluation value of the contrast AF for an object for which a focusing operation was once performed to obtain an in-focus state, decreases by a value greater than a predetermined value, an automatic focusing operation is executed again (hereinafter, focusing operation executed again after focusing will be described as "re-execution operation").

In this case, if the object moves without involving a change in the object distance, such as when the object moves in a parallel direction (horizontal direction) relative to the imaging plane or when panning operation is performed, the evaluation value of the contrast AF may reduces when the object is moving while the object is in in-focus state.

Therefore, based only on the condition that the contrast AF evaluation value reduces by more than a predetermined value, it is difficult to determine whether the object distance is changed or the object has moved without involving a change in the object distance. The re-execution operation of AF that would not be necessary if the object is in in-focus state is executed, and it is significantly uncomfortable to view the picked up image if a search operation is performed.

For example, Japanese Patent Application Laid-Open No. 2007-174521 discloses a technique of using a blur detector to detect a change in the composition and controlling not to perform the focus adjustment during the change in the composition. When there is a change in the composition during shooting of a video, such as by panning, unstable focusing caused by the AF following the change in the distance status of the object in the screen can be prevented.

In the conventional technique disclosed in Japanese Patent Application Laid-Open No. 2007-174521, the AF is terminated during the detection of the change in the composition. Therefore, unstable focusing can be prevented as described above when there is panning.

However, when the object moves parallel to the imaging plane instead of the change in the composition, the AF search may be performed and the focus may become unstable if the contrast AF evaluation value reduces during the movement of the object, because the change in the composition is not detected.

An object of the present invention is to provide an automatic focusing apparatus that can attain both the stability and the followability in AF by appropriately executing an AF re-execution operation when there is a movement of an object or a change in a composition.

CITATION LIST

Patent Literature

PTL 1: Japanese Patent Application Laid-Open No. 2007-174521

SUMMARY OF INVENTION

An automatic focusing apparatus of the present invention includes: a focus lens unit; a focus driver that drives the focus lens unit; a first focus detector that detects an in-focus state based on a phase difference; a second focus detector that detects an in-focus state using a signal from an image pickup element; a focus controller that controls the focus driver to perform focusing based on a first focus detection result detected by the first focus detector and a second focus detection result detected by the second focus detector; a movement detector that detects a movement of an object with components in a direction perpendicular to an optical axis based on an image signal obtained from the first focus detector; and a re-execution determination unit that determines whether to control the focus driver to re-execute focusing based on the first focus detection result and the second focus detection result that are newly detected after the execution of focusing and based on a movement detection result detected by the movement detector.

The present invention can provide an automatic focusing apparatus that can attain both the stability and the followability in automatic focusing.

Further features of the present invention will become apparent from the following description of exemplary embodiments with reference to the attached drawings.

BRIEF DESCRIPTION OF DRAWINGS

FIG. 9 is a flow chart for describing a process of AF re-execution determination (only the contrast AF evaluation value) according to the embodiment.

DESCRIPTION OF EMBODIMENTS

Preferred embodiments of the present invention will now be described in detail in accordance with the accompanying drawings.

Figure 1:
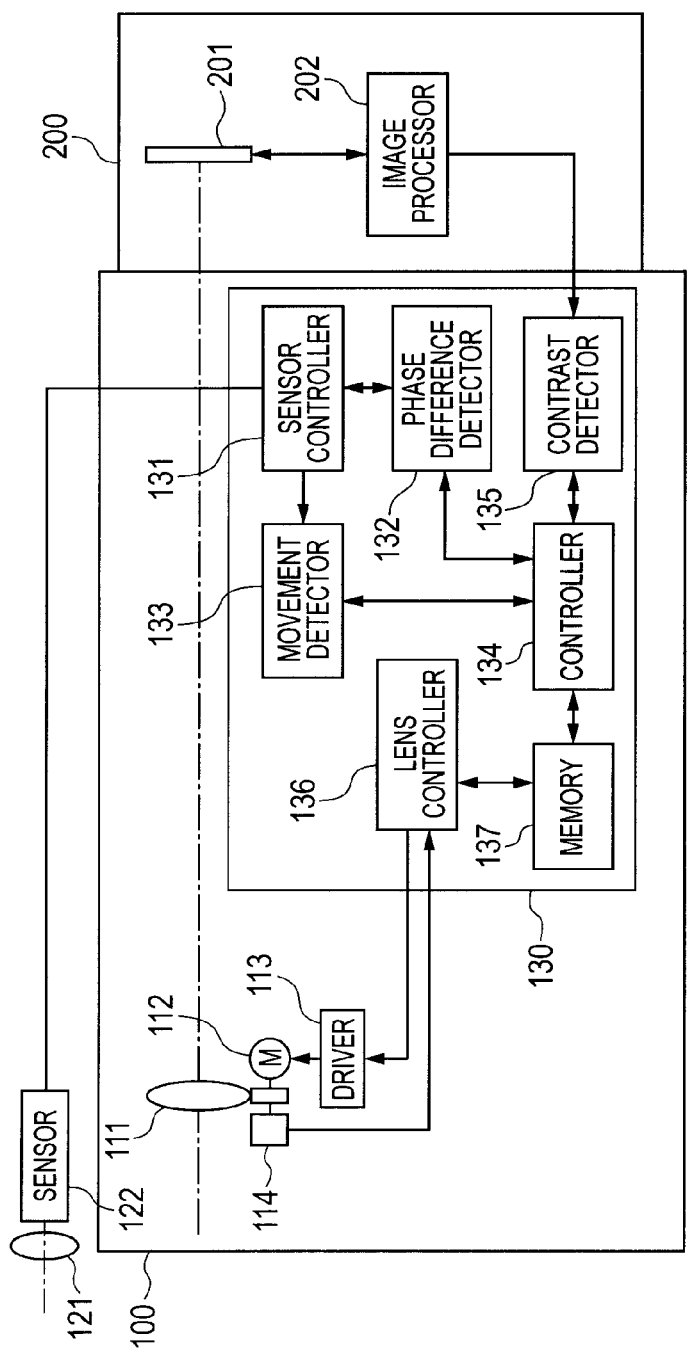
FIG. 1 is a block diagram illustrating a configuration of an automatic focusing apparatus according to an embodiment.

FIG. 1 is a block diagram illustrating a configuration of an automatic focusing apparatus according to the embodiment of the present invention. In FIG. 1, the automatic focusing apparatus of the present invention includes a lens apparatus 100 and a camera apparatus 200.

The lens apparatus 100 includes a focus driver including a focus lens unit 111, a focus motor 112, a driver 113, and a focus position detector 114. The focus motor 112 driven by the driver 113 moves the focus lens unit 111 in an optical axis direction. The focus position detector 114 detects the position of the focus lens unit 111.

The sensor imaging lenses 121 are arranged at positions independent from an optical system where the beam entering an image pickup element 201 described later passes through. The beam that has entered the sensor imaging lenses 121 is divided into two beams, and a pair of images (hereinafter, called "two images") are formed on the external measuring sensors 122. The external measuring sensors 122 photoelectrically convert the formed two images and output two image signals.

Figure 2:
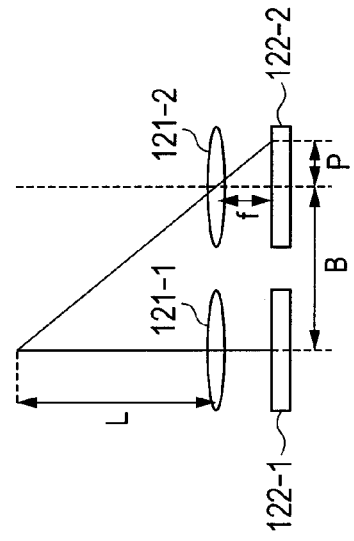
FIG. 2 is a diagram for describing a concept of phase difference detection using external measuring sensors.

FIG. 2 illustrates a conceptual diagram of phase difference detection and object distance calculation using the sensor imaging lenses 121 and the external measuring sensors 122. The sensor imaging lenses 121 include a pair of lenses 121-1 and 121-2, and the external measuring sensors 122 include a pair of area sensors 122-1 and 122-2. A base length of the external measuring sensors 122 is designated with B, a focal length of the sensor imaging lenses 121 is designated with f, and a phase difference between image signals formed on the area sensors 122-1 and 122-2 is designated with P. An object distance L, which is a distance from the object to the sensor imaging lenses 121, can be calculated by Expression (1).

$$L = f \times B / P \qquad (1)$$

Returning to the description of FIG. 1, the lens apparatus 100 includes a CPU 130, and the CPU 130 includes a sensor controller 131, a phase difference detector 132, a movement detector 133, a controller 134, a contrast detector 135, a lens controller 136, and a memory 137 described later.

The sensor controller 131 controls the external measuring sensors 122, obtains two image signals from the external measuring sensors 122, and outputs waveforms of two images (waveforms expressed by signals of two images). Based on the waveforms of two images output by the sensor controller 131, the phase difference detector 132 performs correlation computing to calculate the phase difference to calculate the object distance based on Expression (1).

In the automatic focusing apparatus of the present invention, the sensor imaging lenses 121, the external measuring sensors 122, the sensor controller 131, and the phase difference detector 132 constitute a first focus detector (external measuring AF mechanism) of a phase difference detection system, and the contrast detector 135 constitutes a second focus detector of a contrast system.

Based on the waveforms of two images, the movement detector 133 detects (determines) whether the object has moved with components in a direction perpendicular to the optical axis of the external measuring sensors 122. The movement of the object with components in a direction perpendicular to the optical axis of the external measuring sensors 122 denotes a movement of the object with components in a direction parallel to the imaging plane in a normal case in which the imaging plane is arranged perpendicular to the optical axis. The present embodiment describes a case in which the object moves with components in a horizontal direction of the imaging plane perpendicular to the optical axis (hereinafter, the movement is referred to as "parallel movement"). A method of detecting the parallel movement of the object will be described later.

The controller 134 serving as a focus controlling unit outputs a command value to the lens controller 136 for driving the focus lens unit 111 described later based on an object distance (first focus detection result) obtained from the phase difference detector 132 and a contrast AF evaluation value (second focus detection result) obtained from the contrast detector 135 described later.

The camera apparatus 200 includes the image pickup element 201 and an image processor 202. The image pickup element 201 receives a beam passed through the optical system including the focus lens unit 111 and photoelectrically converts and outputs the beam. The image processor 202 converts the photoelectrically converted signal to an image signal and outputs the image signal to the lens apparatus 100.

The contrast detector 135 of the lens apparatus 100 obtains the image signal from the image processor 202 of the camera apparatus 200. The contrast detector 135 further extracts high frequency components from the obtained image signal to calculate a contrast AF evaluation value used to determine the focus. The lens controller 136 moves the focus lens unit 111 to the target position in the optical axis direction through the driver 113 and the focus motor 112.

The memory 137 stores information necessary for the controller 134 (re-execution determination unit) to determine whether to perform a re-execution operation of AF, such as the waveforms of two images obtained from the external measuring sensors 122, the object distance obtained by the phase difference detector 132, the contrast AF evaluation value obtained by the contrast detector 135, and the focus position.

Figure 3:
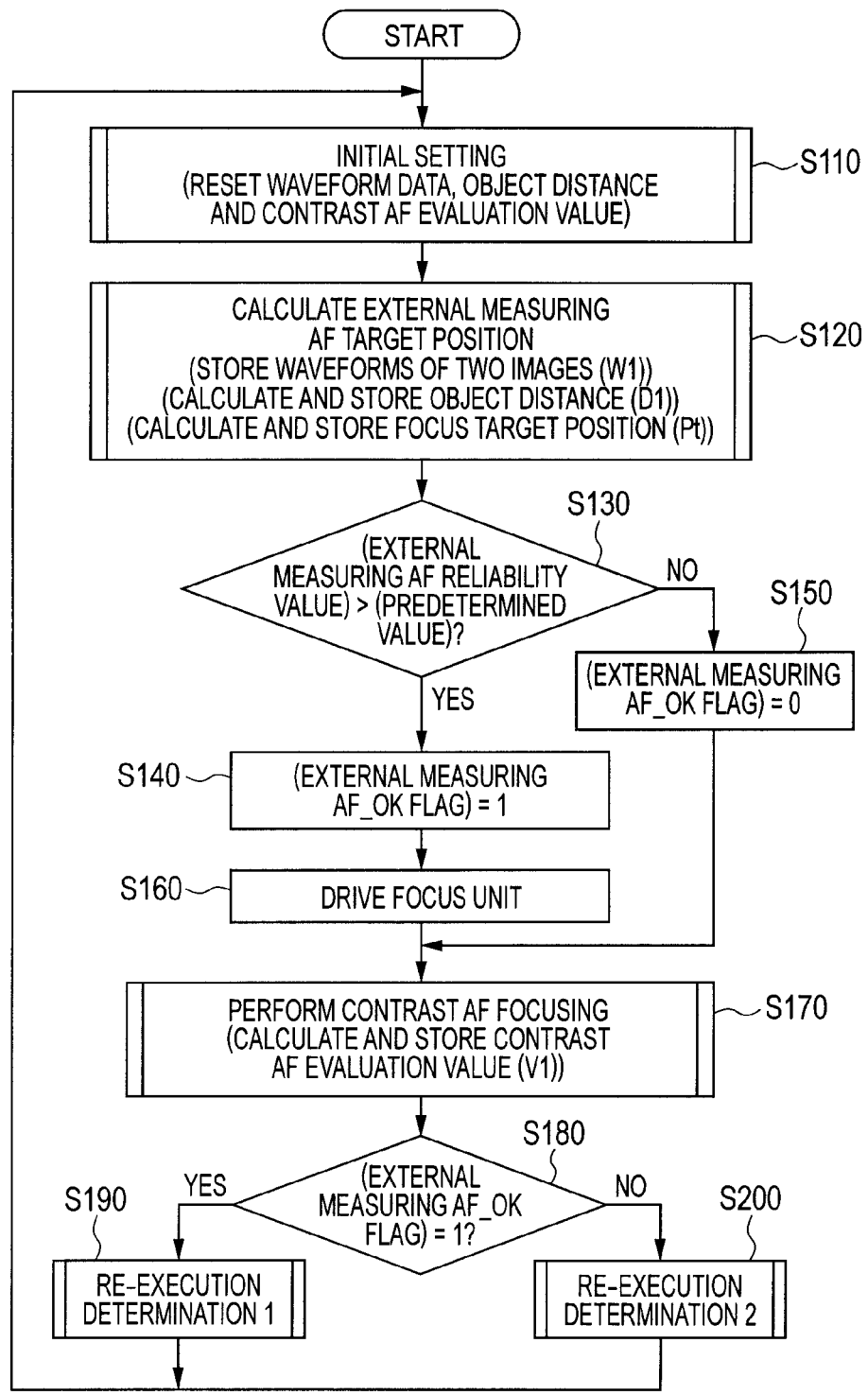
FIG. 3 is a flow chart for describing a focusing operation according to the embodiment.

A flow of a series of AF operations of the automatic focusing apparatus according to the present embodiment will be described with reference to flow charts and drawings of FIG. 3 and subsequent drawings. FIG. 3 illustrates a flow of processes of the AF operations according to the present embodiment. The CPU 130 controls the processes according to a computer program stored in a memory not illustrated. When the power of the lens apparatus 100 is turned on, the CPU 130 executes the processes from step S110. The automatic focusing apparatus according to the present embodiment attains an in-focus state for the target object by way of steps S110 to S170. If it is determined that re-execution of the AF operation is necessary in step S190 or S200, the process is executed again from step S110.

Hereinafter, the processes will be sequentially described.

In step S110, the controller 134 initializes the information necessary for re-execution determination, such as the waveforms of two images of the external measuring AF, the object distance, the contrast AF evaluation value, and the focus position, stored in the memory 137.

In step S120, the external measuring AF mechanism calculates the focus target position. External measuring target position calculation of step S120 will be described with reference to the flow chart of FIG. 4.

Figure 4:
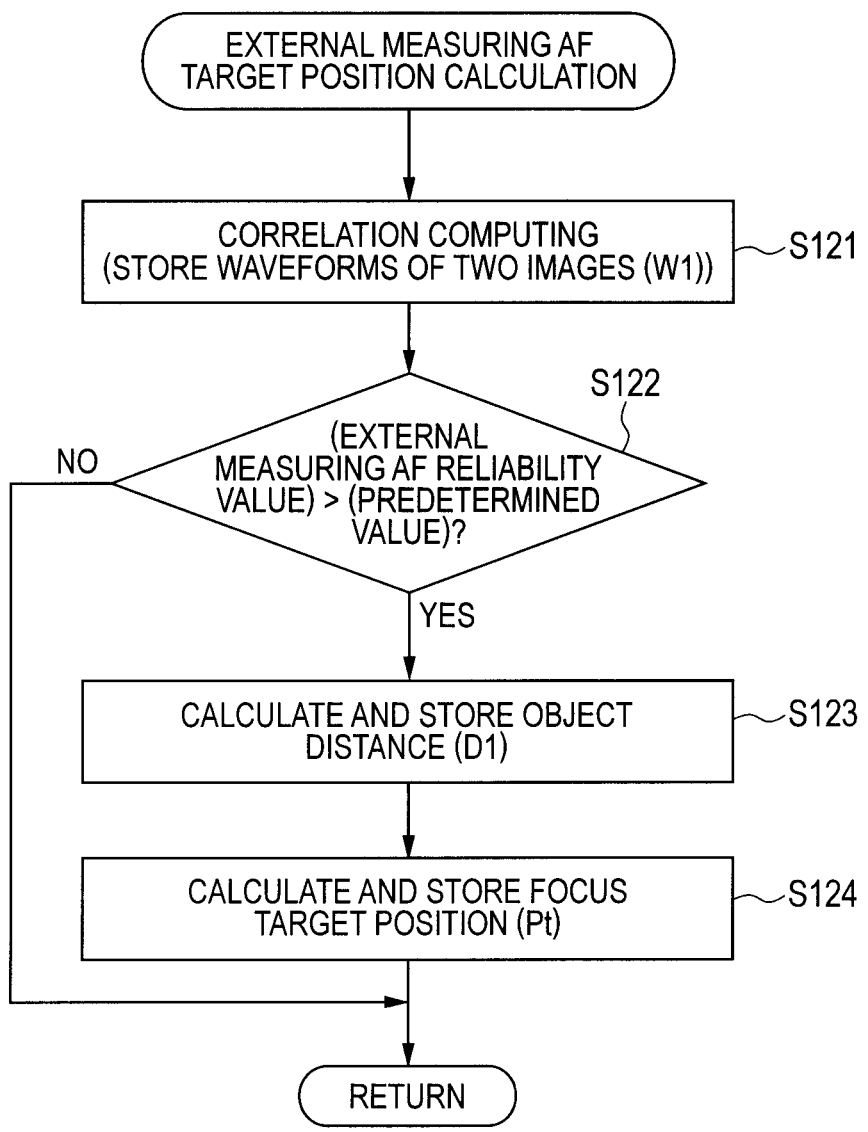
FIG. 4 is a flow chart for describing a process of external measuring AF according to the embodiment.

In step S121 of FIG. 4, the phase difference detector 132 calculates the phase difference by correlation computing based on the obtained waveforms of two images. At this point, waveforms of two images W1 are stored in the memory 137.

In the correlation computing, a coincidence between two images indicating a degree of coincidence between image shapes of the waveforms of two images is taken into consideration. The coincidence between two images is obtained in the process of the correlation computing. The larger the coincidence between two images is, the higher the reliability of the correlation computation result is.

Therefore, if an external measuring AF reliability value is greater than a predetermined value, the correlation computation result is reliable. If the external measuring AF reliability value is smaller than the predetermined value, the correlation computation result is not reliable. In the present embodiment, the coincidence between two images will be called an external measuring AF reliability value. The first focus detector outputs the external measuring AF reliability value, the waveforms of two images, and the object distance as the first focus detection result which is information which relates to the in-focus state detection.

In step S122, if the external measuring AF reliability value is greater than the predetermined value, the process proceeds to step S123. If the external measuring AF reliability value is equal to or smaller than the predetermined value, the focus target position based on the external measuring AF is not calculated, and the process proceeds to step S130 of FIG. 3.

In step S123, the phase difference detector 132 calculates an object distance D1 of the object, not illustrated, by Expression (1) based on the phase difference.

In step S124, the controller 134 calculates a focus target position Pt corresponding to the object distance D1 calculated in step S123. The focus target position is obtained using the object distance D1 calculated in step S123 and a table stored in a program not illustrated. The controller 134 stores the object distance D1 in the memory 137. The process then proceeds to step S130 of FIG. 3.

The process proceeds to step S130 of FIG. 3, and if the external measuring AF reliability value is greater than the predetermined value, the process proceeds to step S140. In step S140, an external measuring AF_OK flag is set to ON indicating that the external measuring AF is reliable, and the process proceeds to step S160.

If the external measuring AF reliability value is equal to or smaller than the predetermined value in step S130, the process proceeds to step S150. The external measuring AF_OK flag is set to OFF, and the process proceeds to step S170.

In step S160, the lens controller 136 drives the focus lens unit 111 to the focus target position Pt obtained in step S124 through the driver 113 and the focus motor 112.

In step S170, a focusing operation by the contrast AF is performed. The contrast AF of step S170 will be described with reference to the flow chart of FIG. 5.

In step S171, the controller 134 performs, at the current focus position, a wobbling operation, that is, an operation in which the focus position is moved to the near side direction and to the infinity direction, to determine the driving direction of the focus lens unit 111 in which the contrast AF evaluation value becomes large.

In step S172, the focus target position is updated to a position separated by a predetermined sampling interval.

In S173, the lens controller 136 drives the focus lens unit 111 toward the focus target position obtained in step S172.

In step S174, the contrast detector 135 extracts high frequency components from the image signal obtained from the image processor 202 to calculate the contrast AF evaluation value.

In step S175, whether the contrast AF evaluation value obtained in step S174 is the maximum value is determined. Steps S171 to S175 are so-called hill-climbing detection, and the search operation is repeated until the maximum value is detected.

If the maximum value is detected in step S175, the process proceeds to step S176. In step S176, the lens controller 136 drives the focus lens unit 111 to the focus position where the maximum value is indicated. The focus position serves as the in-focus point.

In step S177, the controller 134 stores an in-focus contrast AF evaluation value V1 in the memory 137. The process then proceeds to step S180.

In step S180, the controller 134 proceeds to a re-execution determination 1 of step S190 if the external measuring AF_OK flag stored in the memory 137 is ON and proceeds to a re-execution determination 2 of step S200 if the external measuring AF_OK flag is OFF.

If it is determined that the re-execution of the AF operation is necessary in step S190 or S200 based on a newly detected object distance (first focus detection evaluation value) and a contrast AF evaluation value (second focus detection evaluation value) after the adjustment of focus and focusing of the object in step S170, the process is executed again from step S110.

The re-execution determination 1 of step S190 will be described using a flow chart of FIG. 6.

In step S191, the contrast detector 135 executes the same process as in step S174 and calculates a contrast AF evaluation value Vnow.

Figure 5:
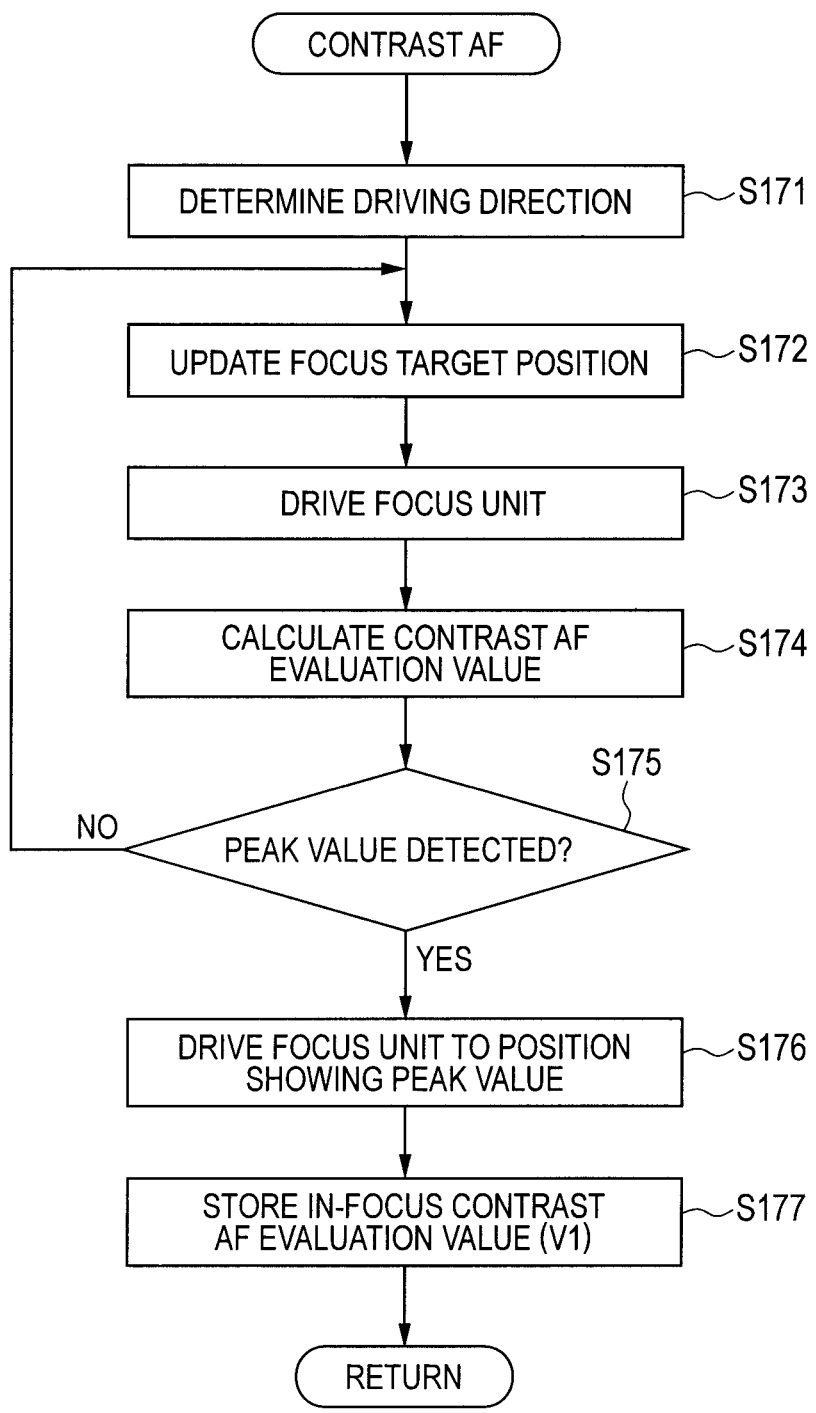
FIG. 5 is a flow cart for describing a process of contrast AF according to the embodiment.

In step S192, the controller 134 compares the in-focus contrast AF evaluation value V1 stored in step S177 of FIG. 5 with the contrast AF evaluation value Vnow calculated in step S191, and if the difference (variation amount) between V1 and Vnow is equal to or smaller than a threshold value ThV1 (equal to or smaller than the first predetermined value), the process returns to step S191. It is determined at this point that there is no change in the position of the object from when the object is focused in step S180. If the difference between V1 and Vnow is greater than the threshold value ThV1, the process proceeds to step S193.

The threshold value ThV1 is a threshold value for determining, for the object focused in step S176, that there is a possibility that the object is out of focus, and it is desirable that the threshold value ThV1 be a relative value with respect to V1, such as 20% of the contrast AF evaluation value V1 in the in-focus state. An appropriate value may be set in each case for the threshold value ThV1 according to the imaging environment, or a fixed value may be written in a program in advance and used.

In step S193, the phase difference detector 132 executes the same process as in step S121 based on the waveforms of two images obtained through the external measuring sensors 122 and the sensor controller 131 and calculates the phase difference by correlation computing. At this point, waveforms of two images Wnow are stored in the memory 137.

In step S194, the phase difference detector 132 executes the same process as in step S123 and calculates an object distance Dnow from the phase difference.

In step S195, the controller 134 compares the object distance D1 in the in-focus state by the external measuring AF stored in step S123 with the object distance Dnow calculated in step S194. If the absolute value of the difference (variation amount) between D1 and Dnow is greater than a threshold value ThD (second predetermined value), it is determined that the re-execution of AF is necessary, and the process returns to step S110 of FIG. 3. The process is executed when the object moves, the object distance changes, and the focus state becomes out of focus.

If the absolute value of the difference between D1 and Dnow is equal to or smaller than the threshold value ThD (equal to or smaller than the second predetermined value), it is determined that the object distance is not changed or that the change in the object distance is within the focusing range, and the process proceeds to step S196.

The threshold value ThD is a distance from the position of the object to the edge of the depth of field beyond which the object would be out of focus. An appropriate value may be set each time for the threshold value ThD according to the depth of field determined from the focal length, an aperture value, and the like of the optical system not illustrated, or a fixed value may be written in a program in advance and used.

In step S196, the movement detector 133 detects whether the object has moved with components parallel to the imaging plane (hereinafter, described as "parallel movement detection") from step S121 to step S193 based on the waveforms of two images W1 stored in step S121 and the waveforms of two images Wnow stored in step S193.

The parallel movement detection of step S196 will be described with reference to FIGS. 7 and 8.

Figure 7:
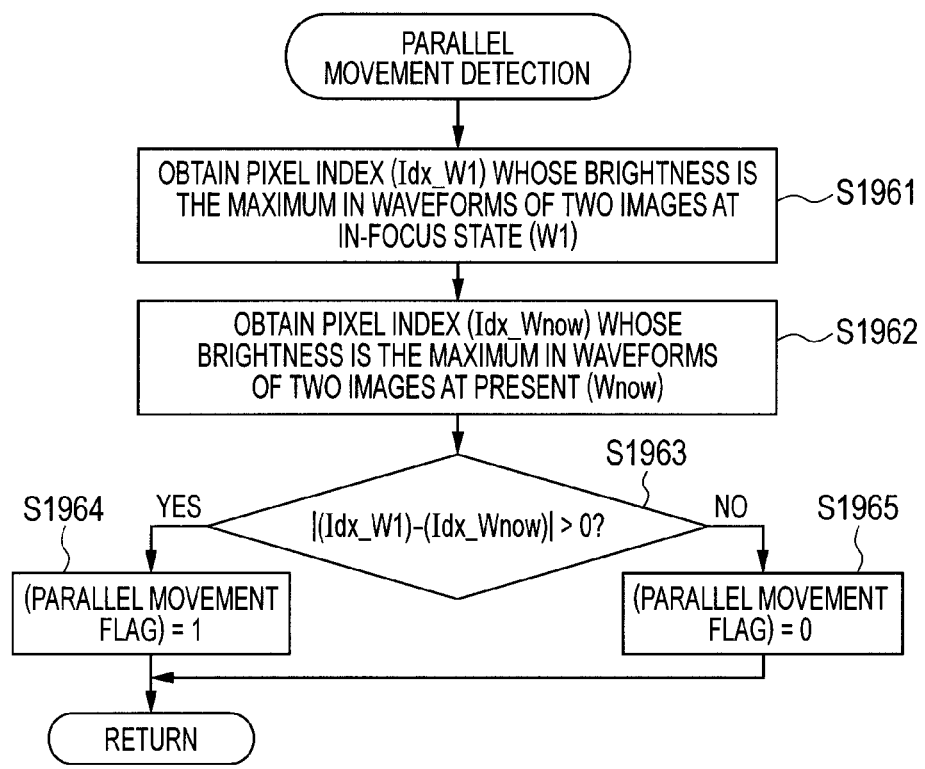
FIG. 7 is a flow chart for describing a process of parallel movement detection of an object according to the embodiment.

In step S1961 of FIG. 7, an index (coordinates) Idx_W1 of a pixel indicating the maximum value of the brightness level in the waveforms of two images W1 stored in step S122 is calculated.

In step S1962, an index Idx_Wnow of a pixel indicating the maximum value of the brightness level in the waveforms of two images Wnow obtained in step S193 is calculated.

Figure 8:
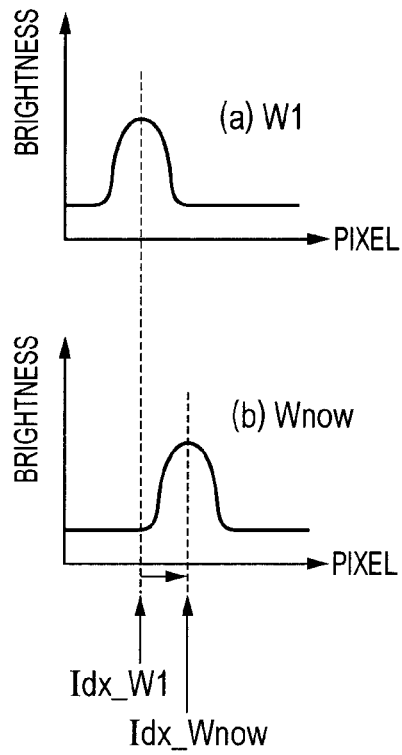
FIG. 8 is a diagram for describing a principle of the parallel movement detection according to the embodiment.

(a) of FIG. 8 illustrates the waveforms of two images W1 in step S121 of FIG. 3. (b) of FIG. 8 illustrates the waveforms of two images Wnow of the object moving to the right without involving a change in the object distance in step S193. Only one of the waveforms of two images is illustrated. The vertical axis indicates the brightness level, and the horizontal axis indicates pixels of the external measuring sensors.

In step S1963, the indices of the pixels obtained in steps S1961 and S1962 are compared. As a result of the comparison, if there is a difference between Idx_W1 and Idx_Wnow as in FIG. 8, the process proceeds to step S1964, and a parallel movement flag is set to ON. On the other hand, if Idx_W1 and Idx_Wnow are equal, the process proceeds to step S1965, and the parallel movement flag is set to OFF. The process then proceeds to step S197 of FIG. 6.

Figure 6:
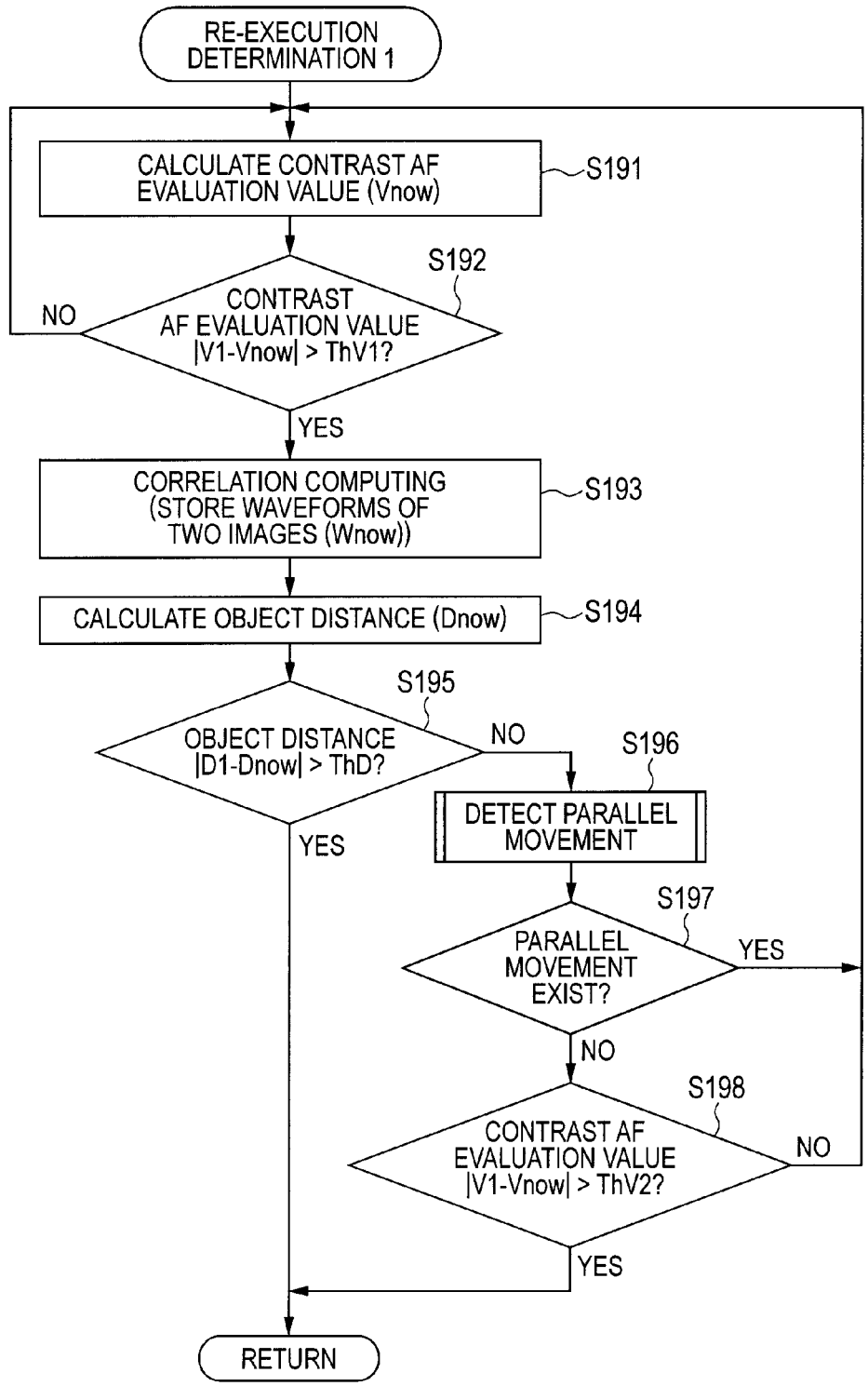
FIG. 6 is a flow chart for describing a process of AF re-execution determination (a contrast AF evaluation value and an external measuring AF result) according to the embodiment.

If the parallel movement flag is ON in step S197 of FIG. 6, the process returns to step S191, and the re-execution determination 1 is executed again. For example, the process is executed while the object is moving in a direction not involving a change in the object distance.

If the parallel movement flag is OFF in step S197, the process proceeds to step S198.

In step S198, the controller 134 compares the contrast AF evaluation value V1 stored in step S177 of FIG. 3 with the contrast AF evaluation value Vnow obtained in step S191.

If the difference (variation amount) between V1 and Vnow is equal to or smaller than a threshold value ThV2 (equal to or smaller than a third predetermined value) that is greater than the threshold value ThV1, the process returns to step S191, and the re-execution determination 1 is executed again. For example, the process is executed when the brightness of the object or the brightness of the surrounding is reduced while the position of the object is not changed.

On the other hand, if the difference between V1 and Vnow is greater than the threshold value ThV2, it is determined that the imaging scene is changed and that the situation is changed from when the object is focused in step S180 (change in the composition is finished), and the process returns to step S110 of FIG. 3 to re-execute the AF. In general, the contrast AF evaluation value often significantly decreases when the imaging scene is changed. The value of the threshold value ThV2 needs to be a value greater than the threshold value ThV1 to detect the change in the imaging scene and the change in the imaging target object (completion of the change in the composition).

A flow of the process when the process proceeds to the re-execution determination 2 of step S200 will be described with reference to a flow chart of FIG. 9. Since the external measuring AF reliability value decreases when the contrast of the object is low, only the contrast AF evaluation value is used to perform the re-execution determination by a known method. An example will be described here.

In step S201 of FIG. 9, the contrast detector 135 calculates the contrast AF evaluation value. The same process as in step S174 is executed to calculate the contrast AF evaluation value Vnow.

In step S202, the controller 134 compares the in-focus contrast AF evaluation value V1 stored in step S177 of FIG. 3 with the contrast AF evaluation value Vnow calculated in step S201. If the difference between V1 and Vnow is greater than a threshold value ThV3 in step S202, the process proceeds to step S203.

In step S203, a counter i for counting the number of times that the difference between V1 and Vnow has exceeded the threshold value is incremented. It is desirable that the threshold value ThV3 be a value equal to the threshold value V1 described above.

In step S205, whether the number of times the difference has exceeded the threshold value is greater than a predetermined number of times is determined. If the number is greater than the predetermined number of times, it is determined that the object is completely out of focus or that the imaging scene is changed (change in the composition is finished). The process returns to step S110 of FIG. 3 to perform the re-execution of the AF.

On the other hand, if the number is not over the predetermined number of times, it is determined that the composition is being changed, and the process proceeds to step S206.

In step S206, if the difference between V1 and Vnow is greater than a threshold value ThV4 (>ThV3), the process returns to step S110 of FIG. 3 to perform the re-execution of the AF regardless of the number of times the difference between V1 and Vnow has exceeded the threshold value.

On the other hand, if the difference between V1 and Vnow is equal to smaller than the threshold value ThV4, the process returns to step S201, and the process of the re-execution determination 2 is executed again. The threshold value ThV4 is a threshold value for determining that the object focused in step S176 is completely out of focus or that the imaging scene is changed (change in the composition is finished). The threshold value ThV4 needs to be a value greater than the threshold value ThV3.

In step S202, the controller 134 compares the contrast AF evaluation value V1 stored in step S170 of FIG. 3 with the contrast AF evaluation value Vnow calculated in step S201. If the difference is equal to or smaller than the threshold value ThV3, the process proceeds to step S204 to clear i. The process returns to step S201 to execute the process of the re-execution determination 2 again.

As described, according to the present embodiment, the re-execution of the AF can be immediately performed when the object distance is changed and the target object becomes out of focus after the object is focused.

Even when the contrast AF evaluation value decreases due to panning of the image pickup apparatus in addition to when the object moves without involving a change in the object distance, unstable focusing caused by a search operation can be prevented by continuing the re-execution determination process of the AF if the in-focus state is maintained.

Furthermore, according to the present embodiment, whether to perform the re-execution operation of the AF is determined by comparing three elements, the change in the contrast AF evaluation value, the change in the object distance, and the parallel movement, with those when the object is in focus. More specifically, the object distance of the AF, the contrast AF evaluation value, and the like are also detected during the re-execution determination. The detection system is always operating, and the re-execution operation can be immediately performed if the re-execution of the AF is necessary.

In this way, an automatic focusing apparatus that can attain both the stability and the followability in the AF can be provided.

As for the setting method of the threshold values ThV1, ThV2, and ThD described in the present embodiment, the threshold values may be automatically set based on the external measuring target position calculation of step S120 or the results of computation performed in the contrast AF focusing operations of step S170, or arbitrary values may be able to be set from the outside. Enabling to arbitrarily set the threshold values allows flexibly changing the threshold values in accordance with imaging conditions, such as indoor image pickup, outdoor image pickup, and night time image pickup, as well as features of a connected image pickup apparatus, and picking up image in excellent conditions can be realized.

In the present embodiment, although the indices of the pixels with the maximum values of brightness level indicated by the waveforms in the waveforms of two images W1 stored in step S121 and the waveforms of two images Wnow stored in step S193 are compared in the method of parallel movement detection in the description, the following method may be used.

For example, indices (coordinates) of pixels at the centers of gravity of the waveforms in the waveforms of two images W1 stored in step S121 and the waveforms of two images Wnow stored in step S193 may be compared.

For example, when there is a phase difference as a result of correlation computing of W1 and Wnow illustrated in FIG. 8, it may be determined that the object has moved parallel. More specifically, it can be determined that the object has moved parallel when a phase difference is obtained as a result of correlation computing of waveforms at a plurality of different times. In this way, the parallel movement can be highly accurately detected even if the image shapes of W1 and Wnow do not completely match each other.

In the present embodiment, although the driving direction of the focus lens unit 111 is determined by the wobbling operation in step S171 of FIG. 5, the driving direction may be determined based on the focus target position Pt calculated in step S124 of FIG. 4.

Although the power of the lens apparatus 100 is turned on, and an in-focus state for the target object is obtained through steps S110 to S180 of FIG. 3 in the description of the present embodiment, the present invention is not limited to the processing procedure and the processing content. The in-focus state for the target object may be obtained only by the contrast AF or only by the external measuring AF. More specifically, a method of obtaining, when the object is focused, the object distance D1, the contrast AF evaluation value V1, and the waveforms of two images W1, which are values necessary for the re-execution determination 1 of step S190 and the re-execution determination 2 of step S200, can be adopted.

In the present embodiment, an example of the object moving to the right without involving a change in the object distance is illustrated in FIG. 8, a movement of the object moving in the vertical direction may also be detected depending on the angle of attaching the external measuring sensors 122.

Although an example of configuration based on the external measuring AF (non-TTL phase difference AF) is illustrated in the present embodiment, the same advantageous effects can be obtained in a configuration based on TTL phase difference AF.

Although the exemplary embodiment of the present invention has been described, the present invention is not limited to the embodiment, and various modifications and changes can be made within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-281466, filed Dec. 17, 2010, which is hereby incorporated by reference herein in its entirety.

The invention claimed is:

1. An automatic focusing apparatus comprising:
 a focus lens unit;
 a focus driver that drives the focus lens unit;
 a first focus detector that detects an in-focus state based on a phase difference;
 a second focus detector that detects an in-focus state using a signal from an image pickup element;
  a focus controller that controls the focus driver to perform focusing based on a first focus detection result detected by the first focus detector and a second focus detection result detected by the second focus detector;
  a movement detector that detects a movement of an object with components in a direction perpendicular to an optical axis based on an image signal obtained from the first focus detector; and
  a re-execution determination unit that determines whether to control the focus driver to re-execute focusing based on the first focus detection result and the second focus detection result that are newly detected after the execution of focusing and based on a movement detection result detected by the movement detector.

2. The automatic focusing apparatus according to claim 1, wherein the re-execution determination unit does not re-execute focusing if a variation amount of the second focus detection result newly detected after the execution of focusing with respect to the second focus detection result in an in-focus state is equal to or smaller than a first predetermined value.

3. The automatic focusing apparatus according to claim 1, wherein the re-execution determination unit re-executes focusing if the variation amount of the second focus detection result newly detected after the execution of focusing with respect to the second focus detection result in an in-focus state is greater than a first predetermined value, and a variation amount of the first focus detection result newly detected after the execution of focusing with respect to the first focus detection result in the in-focus state is greater than a second predetermined value.

4. The automatic focusing apparatus according to claim 1, wherein the re-execution determination unit does not re-execute focusing if the variation amount of the second focus detection result newly detected after the execution of focusing with respect to the second focus detection result in an in-focus state is greater than a first predetermined value, the variation amount of the first focus detection result newly detected after the execution of focusing with respect to the first focus detection result in the in-focus state is equal to or smaller than a second predetermined value, and the movement detector detects the movement of the object with components in the perpendicular direction.

5. The automatic focusing apparatus according to claim 1, wherein the re-execution determination unit re-executes focusing if the variation amount of the second focus detection result newly detected after the execution of focusing with respect to the second focus detection result in an in-focus state is greater than a first predetermined value, the variation amount of the first focus detection result newly detected after the execution of focusing with respect to the first focus detection result in the in-focus state is equal to or smaller than a second predetermined value, the movement detector does not detect the movement of the object with components in the perpendicular direction, and the variation amount of the second focus detection result newly detected after the execution of focusing with respect to the second focus detection result in the in-focus state is greater than a third predetermined value.

6. The automatic focusing apparatus according to claim 1, wherein the re-execution determination unit does not re-execute focusing if the variation amount of the second focus detection result newly detected after the execution of focusing with respect to the second focus detection result in an in-focus state is greater than a first predetermined value, the variation amount of the first focus detection result newly detected after the execution of focusing with respect to the first focus detection result in the in-focus state is equal to or smaller than a second predetermined value, the movement detector does not detect the movement of the object with components in the perpendicular direction, and the variation amount of the second focus detection result newly detected after the execution of focusing with respect to the second focus detection result in the in-focus state is equal to or smaller than a third predetermined value.

7. The automatic focusing apparatus according to claims 1, wherein the movement detector determines that the object has moved with components in the perpendicular direction when coordinates of a maximum value of brightness indicated by waveforms for calculating the phase difference change.

8. The automatic focusing apparatus according to claims 1, wherein the movement detector determines that the object has moved with components in the perpendicular direction when coordinates of centers of gravity of the waveforms for calculating the phase difference change.

9. The automatic focusing apparatus according to claim 1, wherein the movement detector determines whether the object has moved with components in the direction perpendicular to the optical axis based on the phase difference obtained by applying correlation computing to the waveforms at a plurality of different times.

10. A lens apparatus comprising the automatic focusing apparatus according to claim 1.

* * * * *